United States Patent
Shirani-Mehr et al.

(10) Patent No.: US 11,686,588 B2
(45) Date of Patent: *Jun. 27, 2023

(54) ROUTE SAFETY DETERMINATION SYSTEM

(71) Applicant: Uber Technologies, Inc., San Francisco, CA (US)

(72) Inventors: Houtan Shirani-Mehr, Santa Clara, CA (US); Kapil Gupta, Sunnyvale, CA (US); Mir Shahrouz Takyar, San Jose, CA (US); Jaikumar Ganesh, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/655,934

(22) Filed: Mar. 22, 2022

(65) Prior Publication Data
US 2022/0214183 A1    Jul. 7, 2022

Related U.S. Application Data

(63) Continuation of application No. 16/374,295, filed on Apr. 3, 2019, now Pat. No. 11,313,689.

(51) Int. Cl.
*G01C 21/34* (2006.01)
*H04W 4/029* (2018.01)
(Continued)

(52) U.S. Cl.
CPC ..... *G01C 21/3461* (2013.01); *G01C 21/3476* (2013.01); *G06V 20/52* (2022.01);
(Continued)

(58) Field of Classification Search
CPC .............. G01C 21/3461; G01C 21/3476; G01C 21/34; H04W 4/029; G06V 20/52; B60W 50/0098; G06Q 40/08; G08G 1/096775

See application file for complete search history.

(56) References Cited

U.S. PATENT DOCUMENTS 8,805,707 B2    8/2014   Schumann, Jr. et al.
9,927,252 B1    3/2018   Chokshi et al.
(Continued)

FOREIGN PATENT DOCUMENTS

CN     103954278 A  *  7/2014  ......... G01C 21/3476
CN     103954278 A     7/2014
(Continued)

OTHER PUBLICATIONS

U.S. Appl. No. 16/374,272 U.S. Pat. No. 11,320,280, filed Apr. 3, 2019, Location Safety Determination System.
(Continued)

*Primary Examiner* — Behrang Badii
*Assistant Examiner* — Jay Khandpur
(74) *Attorney, Agent, or Firm* — Schwegman Lundberg & Woessner, P.A.

(57) ABSTRACT

Systems and methods are provided for receiving location data for a first location and a second location and generating a plurality of candidate routes to travel from the first location to the second location, based on the location data, each candidate route comprising a plurality of segments. The systems and methods further generate a safety score for each segment of each candidate route of the plurality of candidate routes, generate a safety score for each candidate route based on safety scores generated for each segment associated with each candidate route, select a best candidate route using the safety score associated with each of the candidate routes, and provide a recommendation for a travel route comprising the best candidate route.

20 Claims, 7 Drawing Sheets

(51) Int. Cl.
  *G06V 20/52* (2022.01)
  *B60W 50/00* (2006.01)
  *G08G 1/0967* (2006.01)
  *G06Q 40/08* (2012.01)
(52) U.S. Cl.
  CPC ........ *H04W 4/029* (2018.02); *B60W 50/0098* (2013.01); *G01C 21/34* (2013.01); *G06Q 40/08* (2013.01); *G08G 1/096775* (2013.01)

(56) References Cited

U.S. PATENT DOCUMENTS

| | | | |
|---|---|---|---|
| 10,082,556 | B1 | 9/2018 | Hopcraft et al. |
| 10,152,053 | B1* | 12/2018 | Smith .................. G06Q 10/02 |
| 10,521,321 | B2 | 12/2019 | Jong et al. |
| 11,313,689 | B2 | 4/2022 | Gupta et al. |
| 11,320,280 | B2 | 5/2022 | Gupta et al. |
| 2008/0293430 | A1* | 11/2008 | Blom ................ G01C 21/3484 455/456.1 |
| 2011/0213628 | A1* | 9/2011 | Peak ...................... G06Q 40/08 705/4 |
| 2012/0304156 | A1* | 11/2012 | Feiveson ............. G06F 11/3648 717/131 |
| 2014/0358437 | A1* | 12/2014 | Fletcher ............. G01C 21/3484 701/533 |
| 2015/0294080 | A1 | 10/2015 | Garnavi et al. |
| 2017/0059347 | A1 | 3/2017 | Flier et al. |
| 2018/0047269 | A1 | 2/2018 | Thomas et al. |
| 2018/0328748 | A1 | 11/2018 | Chachra et al. |
| 2018/0341812 | A1* | 11/2018 | Floor .................... G06V 20/42 |
| 2020/0164891 | A1* | 5/2020 | Bender ............. B60W 50/0098 |
| 2020/0318982 | A1 | 10/2020 | Shirani-mehr et al. |
| 2020/0318983 | A1 | 10/2020 | Shirani-mehr et al. |
| 2021/0140777 | A1* | 5/2021 | Balva ................ G01C 21/3484 |

FOREIGN PATENT DOCUMENTS

| | | |
|---|---|---|
| KR | 101483943 B1 | 1/2015 |
| WO | WO-2016163613 A1 | 10/2016 |
| WO | WO-2019047240 A1 | 3/2019 |
| WO | WO-2020206253 A1 | 10/2020 |

OTHER PUBLICATIONS

U.S. Appl. No. 16/374,295 U.S. Pat. No. 11,313,689, filed Apr. 3, 2019, Route Safety Determination System.
"", Machine Translation of WO 2019047240 A1, (2019).
"U.S. Appl. No. 16/374,272, Corrected Notice of Allowability dated Mar. 9, 2022", 11 pgs.
"U.S. Appl. No. 16/374,272, Examiner Interview Summary dated Jul. 29, 2021", 2 pgs.
"U.S. Appl. No. 16/374,272, Final Office Action dated Jun. 8, 2021", 21 pgs.
"U.S. Appl. No. 16/374,272, Non Final Office Action dated Feb. 1, 2021", 20 pgs.
"U.S. Appl. No. 16/374,272, Non Final Office Action dated Aug. 19, 2021", 22 pgs.
"U.S. Appl. No. 16/374,272, Notice of Allowance dated Feb. 18, 2022", 14 pgs.
"U.S. Appl. No. 16/374,272, Response filed Apr. 30, 2021 to Non Final Office Action dated Feb. 1, 2021", 9 pgs.
"U.S. Appl. No. 16/374,272, Response filed Aug. 3, 2021 to Final Office Action dated Jun. 8, 2021", 9 pgs.
"U.S. Appl. No. 16/374,272, Response filed Nov. 1, 2021 to Non Final Office Action dated Aug. 19, 2021", 10 pgs.
"U.S. Appl. No. 16/374,295, Examiner Interview Summary dated Aug. 9, 2021", 2 pgs.
"U.S. Appl. No. 16/374,295, Final Office Action dated Jun. 15, 2021", 17 pgs.
"U.S. Appl. No. 16/374,295, Non Final Office Action dated Mar. 1, 2021", 13 pgs.
"U.S. Appl. No. 16/374,295, Non Final Office Action dated Sep. 24, 2021", 19 pgs.
"U.S. Appl. No. 16/374,295, Notice of Allowance dated Jan. 24, 2022", 13 pgs.
"U.S. Appl. No. 16/374,295, Response filed May 17, 2021 to Non Final Office Action dated Mar. 1, 2021", 10 pgs.
"U.S. Appl. No. 16/374,295, Response filed Aug. 12, 2021 to Final Office Action dated Jun. 15, 2021", 10 pgs.
"U.S. Appl. No. 16/374,295, Response filed Nov. 23, 2021 to Non Final Office Action dated Sep. 24, 2021", 11 pgs.
"Chapter 17 Detecting Objects in Images", Detecting Extracts, 519-530.
"International Application Serial No. PCT/US2020/026577, International Search Report dated Jun. 2, 2020", 5 pgs.
"International Application Serial No. PCT/US2020/026577, Written Opinion dated Jun. 2, 2020", 7 pgs.
"Machine Translation of (KR 101483943 B1)", (2015).
Beyer, F R, et al., "Street lighting for preventing road traffic injuries (Review)", Cochrane Library, (2010), 59 pgs.
Chianis, Alexia, "How Safe Is Your Neighborhood?", https://www.safewise.com/blog/confirm-safety-neighboorhood-online-tools/, (Nov. 28, 2018), 9 pgs.
Goel, Preeti, et al., "Optimal pick up point selection for effective ride sharing", IEEE Transactions on Big Data 2, (2017), 154-168.
Salomon, Brian, et al., "Accelerating Line-of-Sight queries for Terrain Processing using Region Based Visibility", Computer Science, (2006), 6 pgs.
Weissman, A, et al., "2.5D Mapping Using GNSS Signal Analysis", Positioning Navigation and Communication (WPNC), 2013 10th Workshop On, IEEE, [retrieved on Jun. 14, 2013], (Mar. 20, 2013), 1-6.
U.S. Appl. No. 16/374,272, filed Apr. 3, 2019, Location Safety Determination System.
U.S. Appl. No. 16/274,295, filed Ap. 3, 2019, Route Safety Determination System.
"European Application Serial No. 20723617.5, Response to Communication pursuant to Rules 161 and 162 filed May 20, 2022", 19 pgs.

* cited by examiner

ROUTE SAFETY DETERMINATION SYSTEM

CLAIM FOR PRIORITY

This application is a continuation of and claims the benefit of priority to U.S. application Ser. No. 16/374,295, filed Apr. 3, 2019, which is hereby incorporated by reference in its entirety.

BACKGROUND

For a particular destination chosen by a rider of transport, such as a ride sharing service, pickup locations for initiating the ride share or drop-off spots at the destination may be determined based on an algorithm using historical data. For example, based on historical data and a rider location, some common or popular spots may be better suited than others for pickups or drop-offs. Also, a travel route for a driver to pick up a rider and to transport the rider to the desired destination can be determined. Improvements in safety of the waiting rider and a travel route, however, are desired.

BRIEF DESCRIPTION OF THE DRAWINGS

Various ones of the appended drawings merely illustrate example embodiments of the present disclosure and should not be considered as limiting its scope.

DETAILED DESCRIPTION

Systems and methods described herein relate to determining safety of a location and determining a safe route to a location. For example, in a ride sharing or similar service or other transportation scenario, there may be numerous locations near a user where a user can be picked up or access transportation, but no way for the user to know which is the safest location. This may be especially true when the user is in an unfamiliar area. Likewise, there may be numerous routes to a particular destination, but no way for a user to determine which is the safest route to the destination.

In example embodiments, a pickup and/or drop-off location for a user can be recommended based on safety considerations associated with that location, such as the presence of surveillance cameras, brightness or ambient light level, and so forth. In example embodiments, a travel route to the pickup and/or drop-off location can be recommended based on safety considerations associated with the travel route, such as the presence of surveillance cameras, brightness or ambient light level, crime rates for neighborhoods crossed en route, and so forth.

For example, a computing device (e.g., server computer or client device) determines location data corresponding to a location of a user. The computing device retrieves candidate locations for pickup or drop-off locations, based on the location data corresponding to the location of the user, and determines a safety score for each of the candidate locations. The computing device selects a best candidate location using the safety score associated with each of the candidate locations and provides a recommendation for a pickup or drop-off location comprising the best candidate location.

In another example, the computing device receives location data for a first location and a second location and generates a plurality of candidate routes to travel from the first location to the second location, based on the location data, each candidate route comprising a plurality of segments. The computing device generates a safety score for each segment of each candidate route of the plurality of candidate routes and generates a safety score for each candidate route based on safety scores generated for each segment associated with each candidate route. The computing device selects a best candidate route using the safety score associated with each of the candidate routes and provides a recommendation for a travel route comprising the best candidate route.

Figure 1:
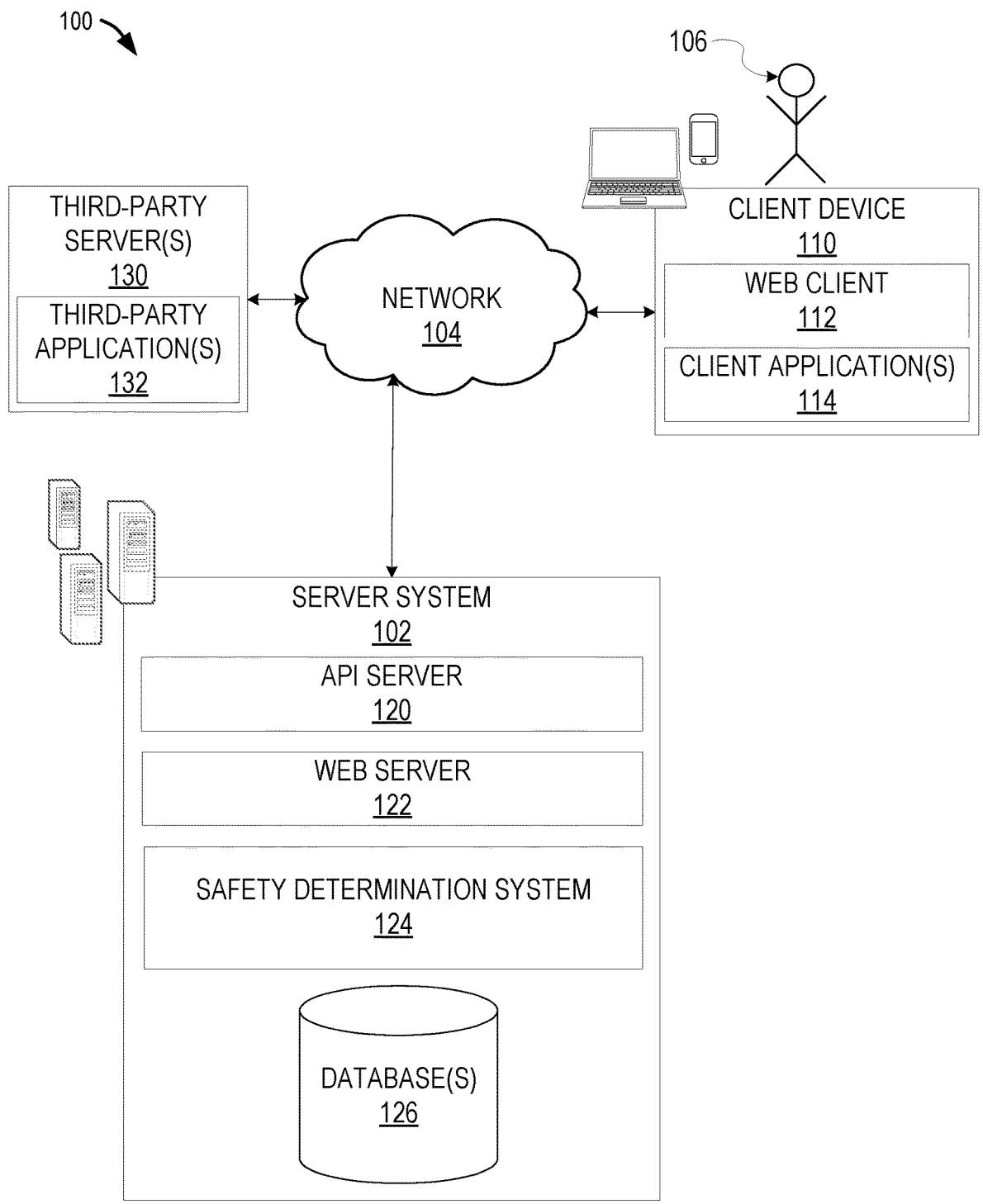
FIG. 1 is a block diagram illustrating a networked system, according to some example embodiments.

FIG. 1 is a block diagram illustrating a networked system 100, according to some example embodiments, configured to determine safety considerations corresponding to a location or travel route, among other functionality described in further detail below. The system 100 includes one or more client devices such as client device 110. The client device 110 may comprise, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other communication device that a user may utilize to access the networked system 100. In some embodiments, the client device 110 may comprise a display module (not shown) to display information (e.g., in the form of user interfaces). In further embodiments, the client device 110 may comprise one or more of touchscreens, accelerometers, gyroscopes, cameras, microphones, global positioning system (GPS) devices, and so forth. The client device 110 may be a device of a user that is used to request map information, provide map information, request navigation information, receive and display results of map and/or navigation information, request data about a place or entity in a particular location, receive and display data about a place or entity in a particular location, receive and display data about a pickup or drop-off location, receive and display data related to navigation to a pickup or drop-off location, and so forth.

One or more users 106 may be a person, a machine, or other means of interacting with the client device 110. In example embodiments, the user 106 may not be part of the system 100 but interacts with the system 100 via the client device 110 or other means. For instance, the user 106 may provide input (e.g., touchscreen input or alphanumeric input) to the client device 110 and the input may be communicated to other entities in the system 100 (e.g., third-party servers 130, server system 102) via a network 104. In this instance, the other entities in the system 100, in response to receiving the input from the user 106, communicate information to the client device 110 via the network 104 to be presented to the user 106. In this way, the user 106 interacts with the various entities in the system 100 using the client device 110. In some example embodiments, the user 106 is a rider in a ride-sharing service, a driver in a ride-sharing service, or a person desiring information about safety of a location.

The system 100 further includes the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 accesses the various data and applications provided by other entities in the system 100 via a web client 112 (e.g., a browser, such as the Internet Explorer® browser developed by Microsoft® Corporation of Redmond, Wash. State) or one or more client applications 114. The client device 110 may include the one or more client applications 114 (also referred to as "apps") such as, but not limited to, a web browser, messaging application, electronic mail (email) application, an e-commerce site application, a mapping or location application, a ride sharing application, and the like.

In some embodiments, the one or more client applications 114 may be included in the client device 110, and configured to locally provide a user interface and at least some of the functionalities, with the client applications 114 configured to communicate with other entities in the system 100 (e.g., third-party servers 130, server system 102), on an as-needed basis, for data and/or processing capabilities not locally available (e.g., access location information, request a pickup or drop-off location, access navigation information, to authenticate the user 106, to verify a method of payment). Conversely, the one or more applications 114 may not be included in the client device 110, and the client device 110 uses its web browser to access the one or more applications hosted on other entities in the system 100 (e.g., third-party servers 130, server system 102).

The server system 102 provides server-side functionality via the network 104 (e.g., the Internet or wide area network (WAN)) to one or more third-party servers 130 and/or one or more client devices 110. The server system 102 may include an application program interface (API) server 120, a web server 122, and safety determination system 124, that are communicatively coupled with one or more databases 126.

The one or more databases 126 are storage devices that store data related to one or more of source code, machine learning model training data, image data (including extracted text from images), place or other mapping data, candidate pickup and drop-off locations, safety-related data (e.g., surveillance equipment data, ambient light data, safety scores), and so forth. The one or more databases 126 may further store information related to the third-party servers 130, third-party applications 132, the client device 110, the client applications 114, the user 106, and so forth. The one or more databases 126 may be cloud-based storage.

The server system 102 is a cloud computing environment, according to some example embodiments. The server system 102, and any servers associated with the server system 102, are associated with a cloud-based application, in one example embodiment.

The safety determination system 124 provides back-end support for the third-party applications 132 and the client applications 114, which may include cloud-based applications. The safety determination system 124 processes safety data from a variety of sources, generates a safety score for one or more locations, determines a best candidate location based on safety considerations, provides a recommended best candidate location for a pickup or drop-off location, generates a safest route, and so forth as described in further detail below. The safety determination system 124 comprises one or more servers or other computing devices or systems.

The system 100 further includes one or more third-party servers 130. The one or more third-party servers 130 comprise one or more third-party application(s) 132. The one or more third-party application(s) 132, executing on the third-party server(s) 130, interact with the server system 102 via a programmatic interface provided by the API server 120. For example, the one or more the third-party applications 132 may request and utilize information from the server system 102 via the API server 120 to support one or more features or functions on a website hosted by a third party or an application hosted by the third party. The third-party website or third-party application 132, for example, provides software version analysis functionality that is supported by relevant functionality and data in the server system 102.

Figure 2:
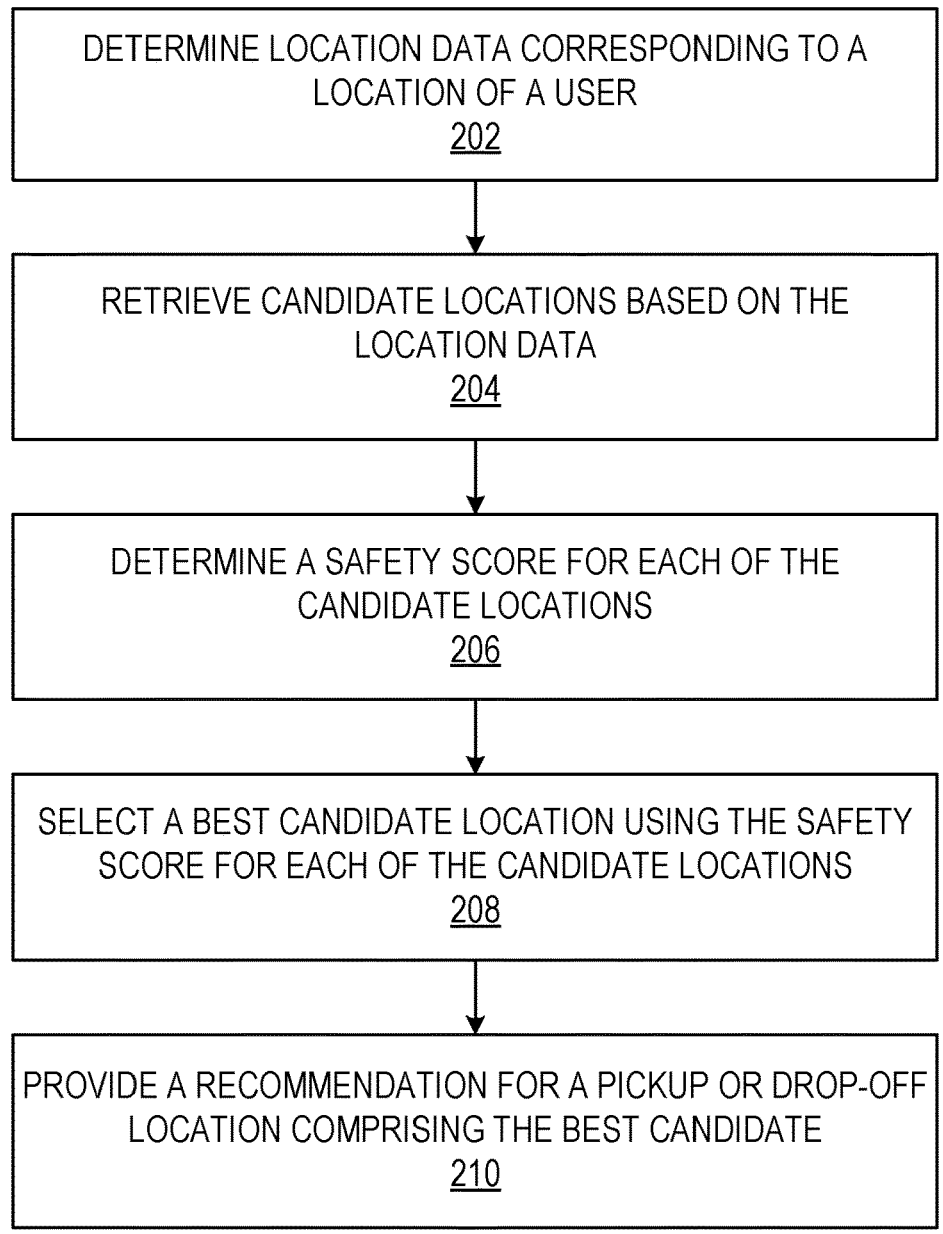
FIG. 2 is flowchart illustrating aspects of a method, according to some example embodiments.

FIG. 2 is a flow chart illustrating aspects of a method 200 for generating a safety score for candidate locations and selecting a best candidate location using the safety score, according to some example embodiments. For illustrative purposes, the method 200 is described with respect to the networked system 100 of FIG. 1. It is to be understood that the method 200 may be practiced with other system configurations in other embodiments.

In operation 202, a computing device (e.g., a server system, such as the server system 102 or the safety determination system 124, or a client device 110) determines location data corresponding to a location of a user. For example, a user may have a computing device such as the client device 110 and be using a client application 114 to request a ride to a particular destination. The client device 110 determines a location of the user by using global positioning system (GPS) technology or similar technology to determine geographical coordinates or other location data corresponding to a location of the client device 110. In one example, the client device 110 sends the geographical coordinates or other location data (e.g., address information, place name associated with the location) corresponding to a location of the client device 110 to a server system (e.g., server system 102 or safety determination system 124). The server system then determines location data from the received geographical coordinates or other location data. In another example, the client device 110 determines the location data from the geographical coordinates or other location data. Location data may also comprise data corresponding to a destination location.

In operation 204, the computing device accesses and retrieves candidate locations for pickup or drop-off locations based on the location data corresponding to the location of the user (e.g., based on a location of a user for a pickup location or a destination for a drop-off location). For example, the computing device accesses one or more data sources (e.g., database(s) 126 or other data source) to search for and retrieve predetermined pickup or drop-off locations corresponding to the location of a user or the destination of the user. In one example, the predetermined pickup or drop-off locations are locations that, based on historical data, are determined common or popular spots for rider locations and determined better suited for pickups or drop-offs for these and other reasons.

In operation 206, the computing device determines a safety score for each of the candidate locations. In one example, determining the safety score comprises generating the safety score in real time (or near real time). In another example, the safety score is generated in advance for each candidate location and stored with each candidate location. In another example, the computing device determines a safety score by determining an already generated safety score for the candidate location (e.g., accessing the stored safety score related to the candidate location) or generating a safety score for the candidate location if a safety score was not previously generated.

In one example, a safety score is generated for a candidate location based on at least one of a presence of surveillance equipment (e.g., one or more surveillance cameras) at or near the candidate location, a brightness or ambient light level of the candidate location, or other criteria. For example, if a surveillance camera is monitoring one of the candidate locations, the candidate location may be considered safer than a candidate location with no surveillance camera. The computing device may get data related to surveillance equipment from one or more data sources (e.g., open source data for surveillance cameras in particular cities), human collection, using machine learning technology (e.g., deep learning), and so forth.

For example, the computing device may access a data source, such as open source data, that stores locations of surveillance cameras in particular cities and other related data, such as information about the camera, the coverage of the camera, and so forth. This data related to surveillance cameras can be stored for each location candidate (if available for a location candidate). The data related to the surveillance cameras may include whether or not there is one or more surveillance cameras for a location, any specifications comprising technical details about any surveillance camera (e.g., type, model, range or coverage (e.g., camera viewing angle), night vision or no night vision, resolution, recording capability, etc.), and so forth.

In another example, the information may be manually collected by users (users of a ride sharing service, employees of a ride sharing service, or other users) inputting areas where they view surveillance equipment. In one example, unsafe areas can be prioritized to collect this data.

In yet another example, machine learning technology, such as deep learning, can be used to detect surveillance cameras or other surveillance equipment from collected imagery data for various locations. For example, imagery data from vehicles with cameras mounted to collect street imagery for map creation can be used to recognize surveillance cameras in traffic light signals, on store fronts, and so forth, using object recognition techniques.

In another example, another factor for generating a safety score is the signal to noise ratio and additional characteristics for GPS satellites (e.g., such as the number of visible satellites). The signal to noise ratio can indicate whether a candidate location comprises an open field or one or more buildings. For example, if the candidate location is in an open field versus a downtown area with tall buildings, this can be used as an additional signal to determine if the candidate location is safe for pickups. For instance, the crime characteristics are different in downtown areas versus open visible area.

For example, signal strength is readily available in GPS measurements in the form of normalized signal strength, carrier to noise density, or signal to noise ratio, as examples. The GPS signal strength, along with other characteristics such as the number of visible satellites, the pattern of satellite visibility (e.g., visible directly or via reflection), and spread of visible satellites over different quadrants, can be used to determine whether a candidate location is an open field or a downtown area. The GPS signal strength and other characteristics in combination with crime characteristics of the downtown area versus the open field area is another measurement that can be used to generate a safety score, as explained in further detail below (e.g., "g").

As explained above, another factor for generating a safety score may be an ambient light level (also referred to herein as "brightness," "brightness level," or "brightness profile") of a candidate location. For example, the amount of brightness in a candidate location may determine whether the candidate location is safer, for example, because it is a brighter location. Brightness or ambient light data can be collected from computing devices, such as smart phones or devices mounted to cars. For example, most computing devices are equipped with an ambient light sensor (ALS) or similar technology that is primarily used to adjust (e.g., dim or brighten) the display screen of the computing device based on the current ambient light. ALS data (e.g., an ALS measurement) can be accessed using public APIs available on the computing devices. This ALS data can be associated with candidate location and stored along with data such as the time of day, day of the week, date, and so forth. In one example, the ambient light level is calculated based on at least one factor of a day of the week, a time of the day, and a month of the year. Various lighting conditions can be determined based on the ALS and associated data.

In another example, street light data can be used to estimate a brightness of a geolocation, such as a candidate location. Street light data can be used in addition to ALS data or in lieu of ALS sensor data if no ALS data is available for a candidate location, in another approach. One approach to measure and estimate a brightness of a candidate location is to run a line of sight query originating from a light source (such as a street light) using a three-dimensional terrain model of an area. In another example, human operators can help with collecting such information. In yet another example, specifications of a street light can be analyzed to determine a brightness level (e.g., whether or not it is an RGB camera).

An example of a device that can be mounted on a car is a beacon device that is a wireless (e.g., Bluetooth) device that can be used to signal to riders that their ride is nearby or help them identify their ride (e.g., by glowing a particular color). In one example, an ALS is included in the beacon device and the beacon device is attached to the windshield or other location of the driver's car.

In one example, an ambient light or brightness profile is generated for each candidate location. Ambient light may depend on multiple factors. One factor is the day of the week. For example, the amount of light in front of a shopping center might depend on the hours that the stores are open, which subsequently depends on the day of the week. Another factor is the time of the day. For example, natural sunlight can play a role in the brightness of a location. Another factor is the month of the year to take into account the seasonal effect (e.g., at what time it gets dark and light) and weather conditions. For example, weather data can be used to understand natural conditions like clouds, rain, and other weather that affects the brightness of a location.

ALS data can be collected from a plurality of computing devices when located in each candidate location, over time. Ideally, ALS data is collected from as many computing devices as possible. A weighted average of the sensor readings can be used to estimate the ambient light level at a candidate location, such as:

$$I(i_B, i_D, i_R) = \alpha_B \times i_B + \alpha_D \times i_D + \alpha_R \times i_R$$

where $i_B$, $i_D$, $i_R$ are the outputs of the ALS expressed in lux unit on beacon device (B), a computing device such as a smart phone of a driver (D), and a computing device such as a smart phone of a rider (R), respectively. Also, $\alpha_B$, $\alpha_D$, $\alpha_R$ are the corresponding weights which are selected based on the reliability of each sensor and a confidence score calculated by each sensor. Due to the use case of each sensor and the fixed position of a beacon in the car, in one example the reading of a sensor on a beacon is considered more reliable than that of a driver's smart phone and rider's smart phone in order, for example, $0 \leq \alpha_R \leq \alpha_D \leq \alpha_B \leq 1$ and $\alpha_R + \alpha_D + \alpha_B = 1$. This inequality, however, does not necessarily hold all the time, and as previously mentioned, the weights are derived based on the existence, reliability, and confidence score of each sensor. The weighted average on the collected data is the ambient light level $I(i_B, i_D, i_R)$ for a particular candidate location and over time updates the brightness profile or ambient light level for the candidate locations (e.g., pickup and drop-off points).

In one example, the brightness profile or ambient light level is generated based on the ALS data, as explained above. In another example, the brightness profile or ambient light level is generated based on the ALS data, on both ALS data and street light data, or on a combination of this data and other light data. The brightness profile or ambient light level for each candidate location is stored as data associated with the candidate location. The brightness profile or ambient light level may comprise various calculations based on a day of the week, a time of day, a month of year, or other factors.

In one example, the brightness profile is generated by storing each initial measurement (e.g., ALS data, street light data, other light data) from a geolocation. In one example, these initial measurements are stored in buckets indicating a month, day, and hour. It is to be understood that other ways of defining buckets may be used in other examples. For example, buckets can be defined using one or more of the hour of the day, the day of the week, the date, the month, the season, whether it is daytime or nighttime, and so forth. The timestamp of the measurement can be used to determine the month, day, and hour (or other date/time data) for each initial measurement. Granularity of geolocation can be configured in the order of meters, for example. For each new measurement received for that geolocation falling into the same bucket, the ambient light level is updated using the new measurement. When a request corresponding to a location is received, the timestamp of the request is used to identify the relevant bucket or buckets and return the historical ambient level for the candidate location.

As explained above, there are various safety measures that can be derived and utilized to generate a safety score and select a best candidate location for a pickup or drop-off location. In one example, the following measures can be used:

presence of a surveillance camera, denoted by s
coverage of the surveillance camera, denoted by c
brightness profile of the pickup spots, denoted by b It is to be understood that less, more, or different measures may be used in various embodiments described herein. For example, another measurement is a score driven by GPS signal strength and other GPS characteristics (e.g., signal to noise ratio (SNR), number and pattern of visible satellites, the spread of satellites, etc. as explained above) and a map of crime characteristics for downtown versus an open field. In one example, the GPS measurements and other characteristics are derived by a weighted average (e.g., of SNR, number and pattern of visible satellites, spread of satellites, etc.) and then a crime rate is applied (e.g., added to or multiplied by) to arrive at a safety score corresponding to GPS measurements. The safety score can be denoted by g.

In one example, to generate a safety score, a multiclass machine learning model, such as a decision tree, can be constructed based on a training dataset to generate the safety score based on the value of s, c, b, (and optionally g) and the trained model for a specific time of day.

In one example, to generate an aggregated safety score, each of these measures (s, c, b, g) can be assigned a weight based on various factors such as time of day (t) and a resolution of a surveillance camera. For example, $w_s(t)$, $w_c(t)$, $w_b(t)$, and $w_g(t)$ are weights for s, c, b, and g accordingly, which depend on time of day t. For example, during daytime, brightness profile (b) has less importance while surveillance camera has a higher importance. As another example, during nighttime a brightness profile may be more important.

Once the weights for these parameters are decided, a function such as the following could be defined to assign a total weight for a point based on time of the day t and the values for other parameters:

$$f(t, s, c, b) = w_s(t) \times s + w_c(t) \times c + w_b(t) \times b + w_g(t) \times g$$

The value of this function could be used along with the other non-safety related parameters such as the count of pickups in deciding a best candidate location. In one example, if the value of this function is less than a threshold for a candidate location, that candidate location are ignored or discarded, and instead other candidate locations are considered for selection.

In one example, heuristics are used to decide the weights for each parameter (e.g., $w_s(t)$, $w_c(t)$, $w_b(t)$, and $w_g(t)$). For example, a beacon may be located in a windshield of a car and is thus more likely not to be blocked and be more reliable. In another example, a driver smartphone may be mounted on a dashboard or other location in the car, and thus may also be more reliable than a rider smartphone that may be in the rider's pocket or backpack or briefcase, or the like.

In one example, a public API on the smartphone (or other mobile computing device) may be used to determine whether the smartphone is blocked by another object (e.g., in a pocket or backpack). For example, the API uses a proximity sensor (e.g., infra red) to detect if there is an object in front of the smartphone. In this example where it is determines that the smartphone is blocked (e.g., in pocket or backpack) the ALS measurement can be ignored since it is not accurate.

In another example, a machine learning model is leveraged to find the values for $w_s(t)$, $w_c(t)$, $w_b(t)$, and $w_g(t)$. In the machine learning model example, a training dataset can be collected as follows. First, a set of users are asked to label the safety of a candidate location with a score of 1 to 5. The amount of brightness, the surveillance camera coverage, and the presence of a surveillance camera at those points are also calculated (e.g., the values of s, c, b, and g). Then, each set of training data will have a time stamp at which the label is assigned and the corresponding values for s, c, b, and g. Next, the values of $w_s(t)$, $w_c(t)$, $w_b(t)$, and $w_g(t)$ are estimated based on a multinomial classification model, such as multiclass regression model, and based on the collected training data.

Using this example, the following process can be used to generate a safety score for different candidate locations. First, a set of location points, denoted by L, are selected as candidate locations, as described above. Then, for each candidate location L, the values of s, c, b, and g are calculated. Users will assign a safety score of 1 to 5 for each candidate location in L. A machine learning model (e.g., a multiclass machine learning model) is trained based on the collected data and time at which the collected data was collected. Then the trained machine learning model is used to generate a safety score. For example, given a new candidate location and the values of s, c, b and g, and a time (which are input into the trained machine learning model), the safety score is calculated by the trained machine learning model for the candidate location and the time. As explained above, the safety score can be generated in advance and stored as data associated with the candidate location, or the safety score can be generated in real time (or near real time) when location data or a request for a recommended candidate location is received.

Figure 3:
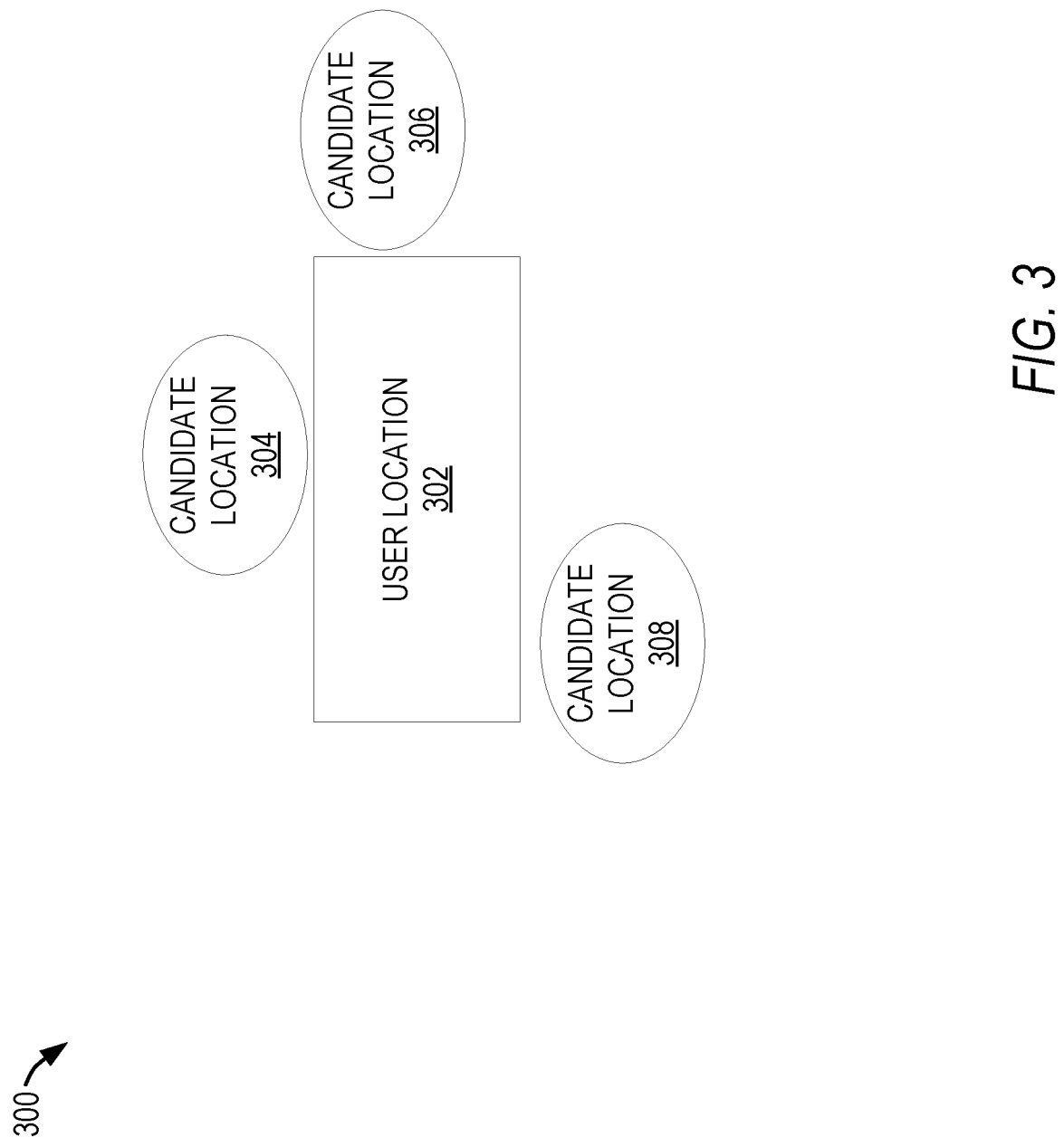
FIG. 3 is a diagram illustrating candidate locations for a user location, according to some example embodiments.

In operation 208, the computing device selects a best candidate location using the safety score associated with each of the candidate locations. For example, FIG. 3 shows diagram 300 illustrating three candidate locations 304, 306, and 308 for a user location 302. Each candidate location 304-308 is associated with an ambient light history which depends on at least one of the day of the week, time of the day, and month of the year. Each candidate location 304-308 has an associated safety score. For example, the safety score for candidate location 304 may be 0.7, the safety score for candidate location 306 may be 0.6, and the safety score for candidate location 308 may be 0.3. In one example, selecting the best candidate comprises determining a candidate location with the highest safety score as the best candidate location. Thus, in the example in FIG. 3, candidate location 304 with a 0.7 safety score is chosen as the best candidate location.

In another example, selecting the best candidate using the safety score associated with each of the candidate locations comprises determining a final score for each candidate location based on a plurality of parameters (e.g., based on historical data such as popularity or frequency of pickup or drop-off at the candidate location), including the safety score, and determining a candidate location with the highest final score as the best candidate location.

In one example, before selecting the best candidate, any candidate locations with a safety score below a predetermined threshold are discarded. For example, if a predetermined threshold is 0.5, any candidate locations with a safety score below 0.5 are discarded/not considered for selecting a best candidate (e.g., candidate location 308 with a safety score of 0.3 in the above example would be discarded/ignored).

Figure 4:
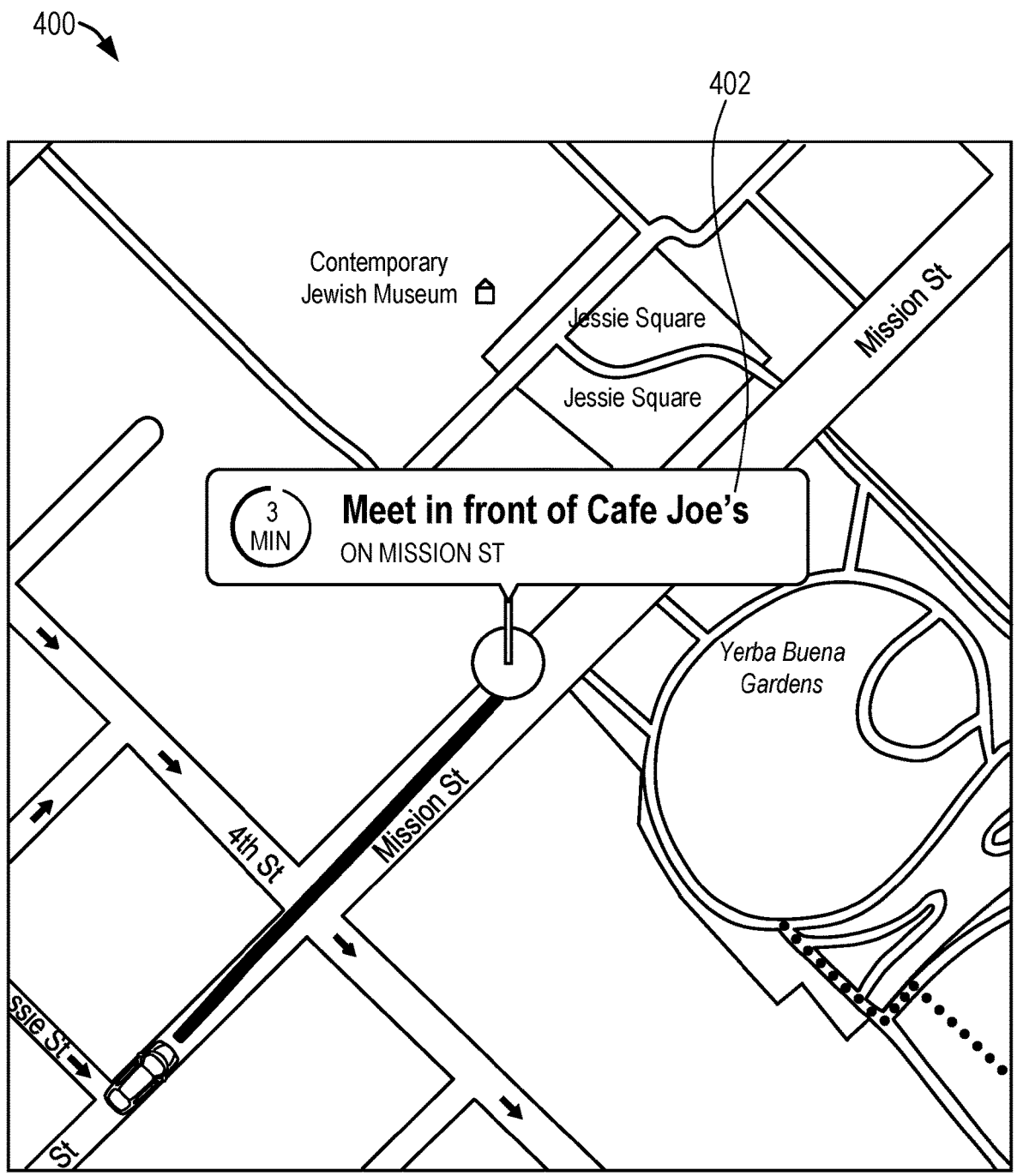
FIG. 4 illustrates an example graphical user interface, according to some example embodiments.

In operation 210, the computing device provides a recommendation for a pickup or drop-off location comprising the best candidate location. In the example where the computing device is a server computer, the server computer provides the recommended best candidate to a client device 110 to be provided to a user. In the example where the computing device is a client device 110, the computing device provides the recommended best candidate location to a user. For example, the client device 110 causes the best candidate location to display on a display of the client device 110, as shown in FIG. 4. For example, the display 400 of FIG. 4 shows a map with a message 402 that includes the best candidate location (e.g., in front of Cafe Joe's) for a pickup location.

In another example, safety is taken into consideration for providing a recommended travel route (e.g., from a first location to a second location, or between multiple locations). For example, a recommended travel route can be recommended based on a safety score for travel from a starting or pickup location to a drop-off or destination location, or from a current location to a pickup location. Thus, like pickup or drop-off safety metrics, similar metrics can be defined for a route which is taken by riders and drivers. For example, a route that passes locations with surveillance cameras is preferred over routes that do not have surveillance cameras. Also, routes that have more light is preferred to potentially decrease the number of accidents.

As explained in further detail below, information to determine which candidate route(s) to recommend may comprise:

How many surveillance cameras are being passed during the whole route.

What is the minimum and maximum brightness of the route.

Average brightness information for each route segment.

The information on crime rate for all the neighborhoods crossed (e.g., using crime data from third-party sources or other data sources).

Depending on the above variables and other information (e.g., time of day), one candidate route may be preferred over other candidate routes.

Figure 5:
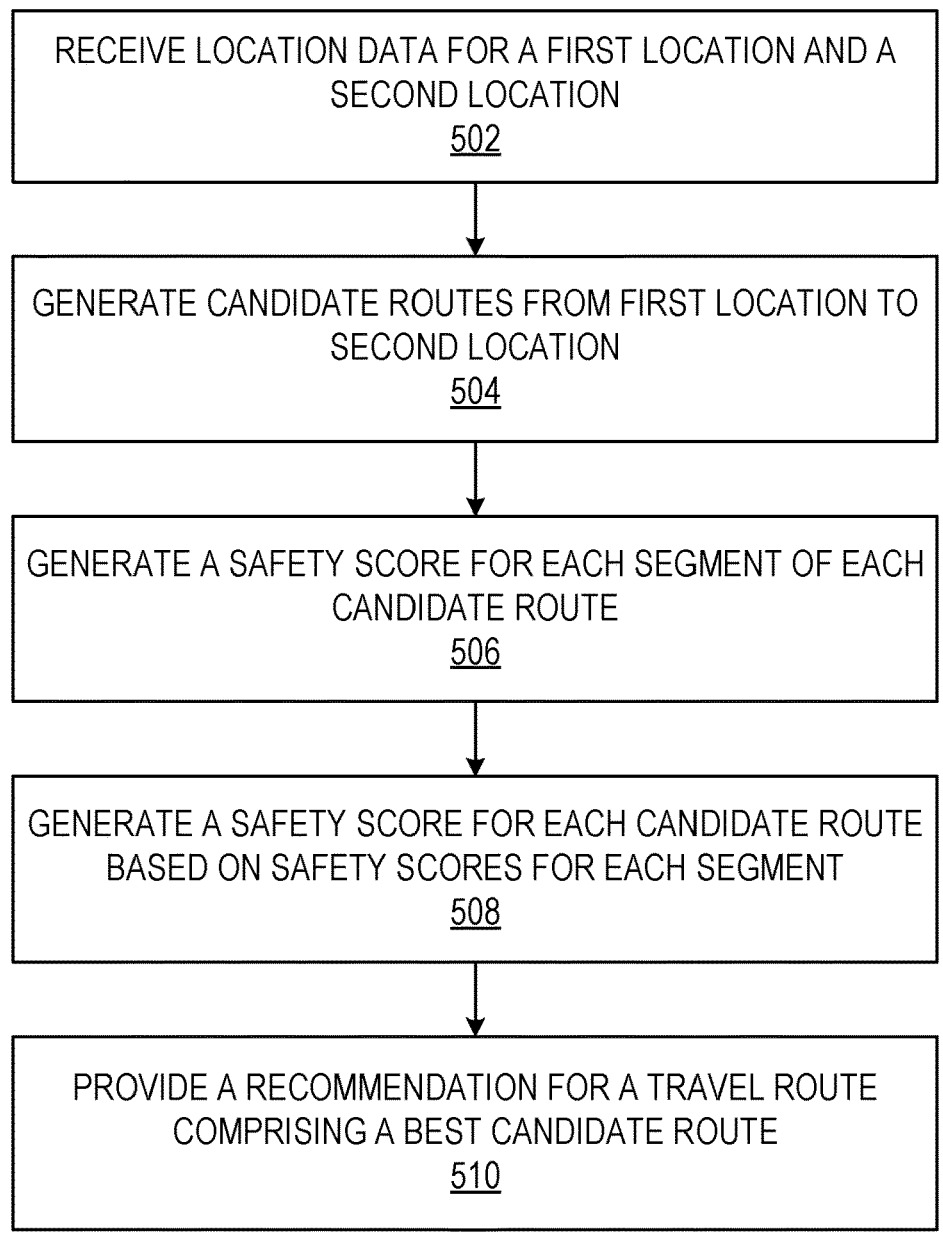
FIG. 5 is a flowchart illustrating aspects of a method, according to some example embodiments.

FIG. 5 is a flow chart illustrating aspects of a method 500 for generating a safety score for candidate routes and selecting a best candidate route using the safety score, according to some example embodiments. For illustrative purposes, the method 500 is described with respect to the networked system 100 of FIG. 1. It is to be understood that the method 500 may be practiced with other system configurations in other embodiments.

In operation 502, a computing device (e.g., a server system, such as the server system 102 or the safety determination system 124, or a client device 110) determines or receives location data corresponding to a first location and a second location. A first location may be a location of a user, as explained above, or a start or pickup location. A second location may be a destination or end location. For example, the location data may be included in a request for a route from a starting location to a destination or end location. In one example, the starting location is a current location of a user based on the location of his or her computing device (e.g., smart phone, tablet, car computer, etc.), and the destination is a location to which the user intends to travel (e.g., a pickup or drop-off location). In one example, the location data comprises geographical coordinates of the first location and geographical coordinates of the second location.

For example, a user may have a computing device such as client device 110 that is using a client application 114 to request a ride to a particular destination. The client device 110 determines a location of the user by using global positioning system (GPS) technology or similar technology to determine geographical coordinates or other location data corresponding to a location of the client device 110. The user may also indicate, via the client device 110, a destination location (e.g., by entering an address or a name of a place).

In one example, the client device 110 sends the geographical coordinates or other location data (e.g., address information, place name associated with the location) corresponding to a location of the client device 110 and the destination location to a server system (e.g., server system 102 or safety determination system 124). The server system then determines location data from the received geographical coordinates or other location data. In another example, the client device 110 determines the location data from the geographical coordinates or other location data.

In operation 504, the computing device generates a plurality of candidate routes for travel from the first location to the second location (e.g., from a start location to an end location or destination), based on the location data. For example, the plurality of candidate routes can be generated based on a shortest distance from the first location to the second location, a fastest time to travel from the first location to the second location, a most scenic route, and so forth. In one example, candidate routes are generated by route finding or navigation technology, such as the Dijkstra algorithm.

In one embodiment, each street on a map is divided into multiple segments. For example, a segment may be a few meters long or hundreds of meters long based on the type of street (e.g., highway, road, rural area, city). In one example, each segment is represented by a unique identifier. Each segment may also be associated with a geometric feature (e.g., straight line, curve, circle). A series of segments leads to a route from a first location to a second location. Accordingly, each candidate route comprises a list or a plurality of segments.

In one example, it is possible to generate a very large amount of candidate routes. In this example, the number of candidate routes may be limited to a predetermined number (e.g., 2, 3, 7, 10, 15).

In one example, to calculate a safety score for a candidate route, a safety score for each segment within a candidate route is calculated. Subsequently, the safety scores of the segments within a route are combined to generate the safety score of the candidate route.

In operation 506, the computing device generates a safety score for each segment of each candidate route of the plurality of candidate routes. In one example, generating a safety score is based on at least one feature of a plurality of features, such as a number of surveillance cameras located in the segment, brightness or ambient light information for the segment, crime data for the segment, and so forth.

For example, given a candidate route which includes a list of n segments $seg_1, seg_2, \ldots seg_n$, the safety score for each segment $seg_i$ is defined based on the following features and corresponding assigned weights:

Number of surveillance cameras along the segment denoted by s and assigned the weight of $w_s$.

Minimum and maximum brightness of the segment denoted by min and max and assigned the weights of $w_{bmin}(t)$ and $w_{bmax}(t)$.

Average brightness information for each segment denoted by avg and assigned the weight of $w_{bavg}(t)$ Crime rate for the crossed neighborhoods denoted by c and assigned the weight of $w_c$.

Data to determine the number of surveillance cameras along the segment (and other information about surveillance cameras) can be determined as described above with respect to determining candidate locations for pickup or drop-off locations. For example, the computing device accesses a data source, such as open source data, that stores locations of surveillance cameras in particular cities and other related data, such as information about the camera, the coverage of the camera, and so forth. The data related to the surveillance cameras may include whether or not there is one or more surveillance cameras for a location, any specifications comprising technical details about any surveillance camera (e.g., type, model, range or coverage (e.g., camera viewing angle), night vision or no night vision, resolution, recording capability), and so forth.

In another example, the information may be manually collected by users (e.g., users of a ride sharing service, employees of a ride sharing service, or other users) inputting areas where they view surveillance equipment. In one example, unsafe areas can be prioritized to collect this data.

In yet another example, machine learning technology, such as deep learning, can be used to detect surveillance cameras or other surveillance equipment from collected imagery data for various locations. For example, imagery data from vehicles with cameras mounted to collect street imagery for map creation can be used to recognize surveillance cameras in traffic light signals, on store fronts, and so forth, using object recognition techniques.

Brightness or ambient light levels can be determined as described above with respect to determining candidate locations for a pickup or drop-off location. For example, brightness or ambient light levels can be determined from ALS data, street lights, and so forth as explained in detail above.

In one example, crime rate data can be accessed via third-party sources that generate and provide such information. For example, the computing device can access one or more data sources to retrieve crime data related to neighborhoods, cities, or other locations that are traversed by one or more route candidates. In one example, the crime rate is a ratio of crimes in an area (e.g., in a segment or in a neighborhood associated with a segment or candidate route) to the population of that area. In one example, this can be expressed per a predetermined number of population (e.g., 1000; 100,000) per year. In another example, the crime rate is another value, such as a crime score for a segment (or for one or more neighborhoods or areas represented by the segment).

For brightness (or ambient light) related measures, in one example, weights are defined as piecewise linear functions based on the time of the day t as well as a set of empirical thresholds on min and max brightness. In this example, for ease of notation, the same weight is used for a single feature for all segments. In other examples, each segment could have a different weight for a single feature. For example, $w_s$ could be different for $seg_1$ than that of $seg_2$. Subsequently, to find a safety score for a segment, a function is defined to combine all the factors (features) as well as the associated weights for a segment $seg_i$:

$$f_i(t, s, \min, \max, avg, c) = \\ w_s \times s + w_{bavg}(t) \times avg + w_{bmin}(t) \times \min + w_{bmax}(t) \times \max + w_c \times c$$

In one example, weights in calculation of $f_i$ are assigned such that the safety score of the segment is normalized to a value belonging to the interval of [0, 1]. Thus, each segment will comprise a safety score between the value of 0 and 1.

In operation 508, the computing device generates a safety score for each candidate route based on the safety scores generated for each segment associated with each candidate route. For example, for a candidate route which includes multiple segments $seg_1, seg_2, \ldots seg_n$, the overall function value for the candidate route can be defined as the average of the function value for the segments of the route, as shown in the following equation:

$$f(t, s, \min, \max, avg, c) = \frac{1}{n}\sum_{i=1}^{n} f_i(t, s, \min, \max, avg, c)$$

In one example, in the above equation there is an optional preprocessing step in which to check whether there is a segment with the safety score of $f_i$ less than a minimum safety threshold. In one example, candidate routes that contain a segment that is below a minimum safety threshold are disqualified. For example, the computing device may determine whether a safety score of a segment is below a specified minimum safety threshold. If a segment is below a specified minimum safety threshold, the candidate route containing the segment is discarded (and thus not considered for selecting or recommending a travel route). Applying this minimum threshold is optional and also depends on the availability of multiple routes to a destination. For example, if there is only one candidate route or all the candidate routes comprise the segment with the score below the minimum threshold, the candidate route(s) would not be discarded.

The computing device selects a best candidate route using the safety score associated with each of the candidate routes. For example, each candidate route is associated with a safety score. In one example, the safety score is a value between 0 and 1 (e.g., 0.3, 0.6, 0.9). In one example, selecting the best candidate route comprises determining a candidate route with the highest safety score as the best candidate route. For example, a candidate route with a safety score of 0.9 would be chosen over candidate routes with scores of 0.3 and 0.6. In another example, the best candidate routes can be color coded based on the safety score, as described above, and a rider could select the route desired.

In another example, selecting the best candidate route using the safety score associated with each of the candidate routes comprises determining a final score for each candidate location based on a plurality of parameters (e.g., fastest route, shortest route, most scenic route) including the safety score and determining a candidate route with the highest final score as the best candidate route. For example, the value of the above function is used along with the other existing metrics (e.g., fastest route, shortest route, most scenic route) to determine an optimal (best) route for the trip.

In one example, before selecting the best candidate, any candidate routes with a safety score below a predetermined threshold are discarded. For example, if a predetermined threshold is 0.5, any candidate locations with a safety score below 0.5 are discarded/not considered for selecting the best candidate. In one example, any candidate route comprising a safety score for one or more segments that is below a predetermined threshold is also discarded, as described above.

In operation 510, the computing device provides a recommendation for a travel route comprising the best candidate. In the example where the computing device is a server computer, the server computer provides the recommended best candidate route to a client device 110 to be provided to a user. In the example where the computing device is a client device 110, the computing device provides the recommended best candidate route to a user. For example, the client device 110 causes the best candidate route to display on a display of the client device 110. For example, the client device 110 causes a map with the candidate route highlighted on the map, a set of navigation instructions for the candidate route, or other method of displaying the candidate route.

In one example, the computing device provides more than one candidate route for a travel route. For example, the computing device may provide the top candidate routes, such as the best two or three candidate routes, based on the safety score for each candidate route or based on an overall or final score that takes into account the safety score. In another example, the computing device causes the more than one candidate route to be displayed on the client device 110. In one example, an indication of safety for each route can also be displayed for each route. For example, the routes can be color-coded to indicate which routes are safest (e.g., green for safest, yellow for moderately safe, red for unsafe), an icon or message may appear near each route, or other indication may be displayed to indicate how safe each route is.

The following examples describe various embodiments of methods, machine-readable media, and systems (e.g., machines, devices, or other apparatus) discussed herein.

1. A computer-implemented method comprising:
receiving, by a computing device, location data for a first location and a second location;
generating, by the computing device, a plurality of candidate routes to travel from the first location to the second location, based on the location data, each candidate route comprising a plurality of segments;
generating, by the computing device, a safety score for each segment of each candidate route of the plurality of candidate routes;
generating, by the computing device, a safety score for each candidate route based on safety scores generated for each segment associated with each candidate route;
selecting, by the computing device, a best candidate route using the safety score associated with each of the candidate routes; and
providing, by the computing device, a recommendation for a travel route comprising the best candidate route.

Example 2. A computer-implemented method according to any of the previously examples, wherein the location data comprises geographical coordinates for the first location and geographical coordinates for the second location.

Example 3. A computer-implemented method according to any of the previously examples, wherein generating the safety score for each segment is based on at least one feature of a plurality of features comprising a number of surveillance cameras located in the segment, a field of view of surveillance cameras, brightness information for the segment, or crime data for the segment.

Example 4. A computer-implemented method according to any of the previously examples, wherein each feature used to generate the safety score for each segment is assigned a weight.

Example 5. A computer-implemented method according to any of the previously examples, wherein generating the safety score for each candidate route comprises combining the safety scores for the segments of each candidate route to generate the safety score for each candidate route.

Example 6. A computer-implemented method according to any of the previously examples, wherein generating the safety score for each candidate route is based on at least one factor of a plurality of factors comprising a number of surveillance cameras in the segments of each candidate route, a minimum brightness of each segment, a maximum brightness of each segment, average brightness information for each segment, a crime rate for each segment, or a crime rate for neighborhoods crossed by the candidate route.

Example 7. A computer-implemented method according to any of the previously examples, wherein each factor used to generate the safety score for each candidate route is assigned a weight.

Example 8. A computer-implemented method according to any of the previously examples, wherein providing the recommendation for the travel route comprises providing the top candidate routes.

Example 9. A computer-implemented method according to any of the previously examples, wherein the recommendation is provided to a second computing device and the top candidate routes are displayed in a display of the second computing device with an indication of safety for each of the top candidates.

Example 10. A computing device comprising:
 a memory that stores instructions; and
 one or more processors configured by the instructions to perform operations comprising:
  receiving location data for a first location and a second location;
  generating a plurality of candidate routes to travel from the first location to the second location, based on the location data, each candidate route comprising a plurality of segments;
  generating a safety score for each segment of each candidate route of the plurality of candidate routes;
  generating a safety score for each candidate route based on safety scores generated for each segment associated with each candidate route;
  selecting a best candidate route using the safety score associated with each of the candidate routes; and
  providing a recommendation for a travel route comprising the best candidate route.

Example 11. A computing device according to any of the previously examples, wherein the location data comprises geographical coordinates for the first location and geographical coordinates for the second location.

Example 12. A computing device according to any of the previously examples, wherein generating the safety score for each segment is based on at least one feature of a plurality of features comprising a number of surveillance cameras located in the segment, a field of view of coverage of surveillance cameras, brightness information for the segment, or crime data for the segment.

Example 13. A computing device according to any of the previously examples, wherein each feature used to generate the safety score for each segment is assigned a weight.

Example 14. A computing device according to any of the previously examples, wherein generating the safety score for each candidate route comprises combining the safety scores for the segments of each candidate route to generate the safety score for each candidate route.

Example 15. A computing device according to any of the previously examples, wherein generating the safety score for each candidate route is based on at least one factor of a plurality of factors comprises a number of surveillance cameras in the segments of each candidate route, a minimum brightness of each segment, a maximum brightness of each segment, average brightness information for each segment, a crime rate for each segment, or a crime rate for neighborhoods crossed by the candidate route.

Example 16. A computing device according to any of the previously examples, wherein each factor used to generate the safety score for each candidate route is assigned a weight.

Example 17. A computing device according to any of the previously examples, wherein providing the recommendation for the travel route comprises providing the top candidate routes.

Example 18. A computing device according to any of the previously examples, wherein the recommendation is provided to a second computing device and the top candidate routes are displayed in a display of the second computing device with an indication of safety for each of the top candidates.

Example 19. A non-transitory computer-readable medium comprising instructions stored thereon that are executable by at least one processor to cause a computing device to perform operations comprising:
 receiving location data for a first location and a second location;
 generating a plurality of candidate routes to travel from the first location to the second location, based on the location data, each candidate route comprising a plurality of segments;
 generating a safety score for each segment of each candidate route of the plurality of candidate routes;
 generating a safety score for each candidate route based on safety scores generated for each segment associated with each candidate route;
 selecting a best candidate route using the safety score associated with each of the candidate routes; and
 providing a recommendation for a travel route comprising the best candidate route.

Example 20. A non-transitory computer-readable medium according to any of the previously examples, wherein generating the safety score for each segment is based on at least one feature of a plurality of features comprising: a number of surveillance cameras located in the segment, brightness information for the segment, and crime data for the segment.

Figure 6:
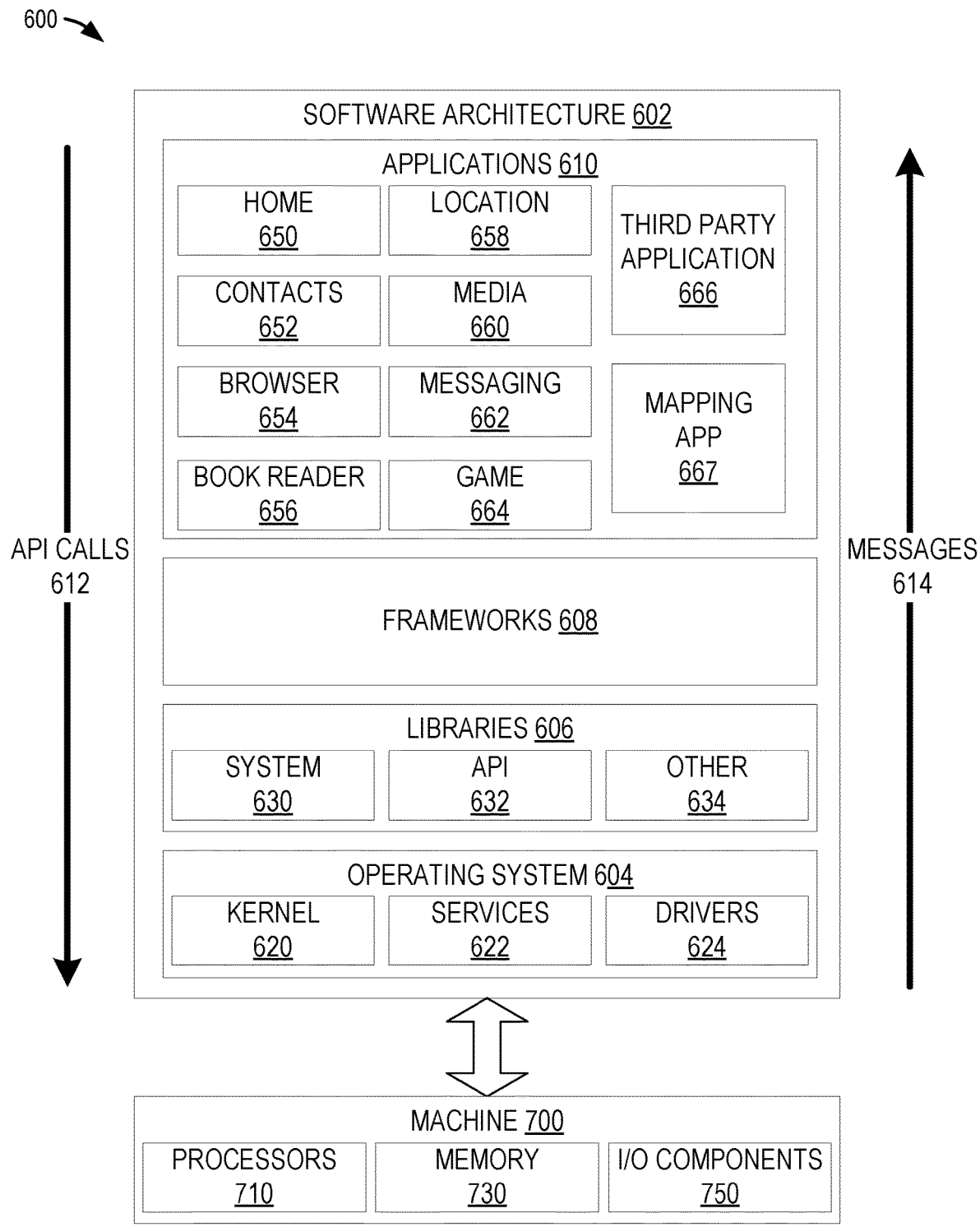
FIG. 6 is a block diagram illustrating an example of a software architecture that may be installed on a machine, according to some example embodiments.

FIG. 6 is a block diagram 600 illustrating software architecture 602, which can be installed on any one or more of the devices described above. For example, in various embodiments, client devices 110 and servers and systems 130, 102, 120, 122, and 124 may be implemented using some or all of the elements of software architecture 602. FIG. 6 is merely a non-limiting example of a software architecture, and it will be appreciated that many other architectures can be implemented to facilitate the functionality described herein. In various embodiments, the software architecture 602 is implemented by hardware such as machine 700 of FIG. 7 that includes processors 710, memory 730, and I/O components 750. In this example, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke application programming interface (API) calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematical functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphic user interface (GUI) functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications such as a third-party application 666. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 666 can invoke the API calls 612 provided by the operating system 604 to facilitate functionality described herein.

Some embodiments may particularly include a mapping application 667. In certain embodiments, this may be a stand-alone application that operates to manage communications with a server system such as third-party servers 130 or server system 102. In other embodiments, this functionality may be integrated with another application. The mapping application 667 may request and display various data related to mapping and navigation, and may provide the capability for a user 106 to input data related to the objects via a touch interface, keyboard, or using a camera device of machine 700, communication with a server system via I/O components 750, and receipt and storage of object data in memory 730. Presentation of information and user inputs associated with the information may be managed by mapping application 667 using different frameworks 608, library 606 elements, or operating system 604 elements operating on a machine 700.

Figure 7:
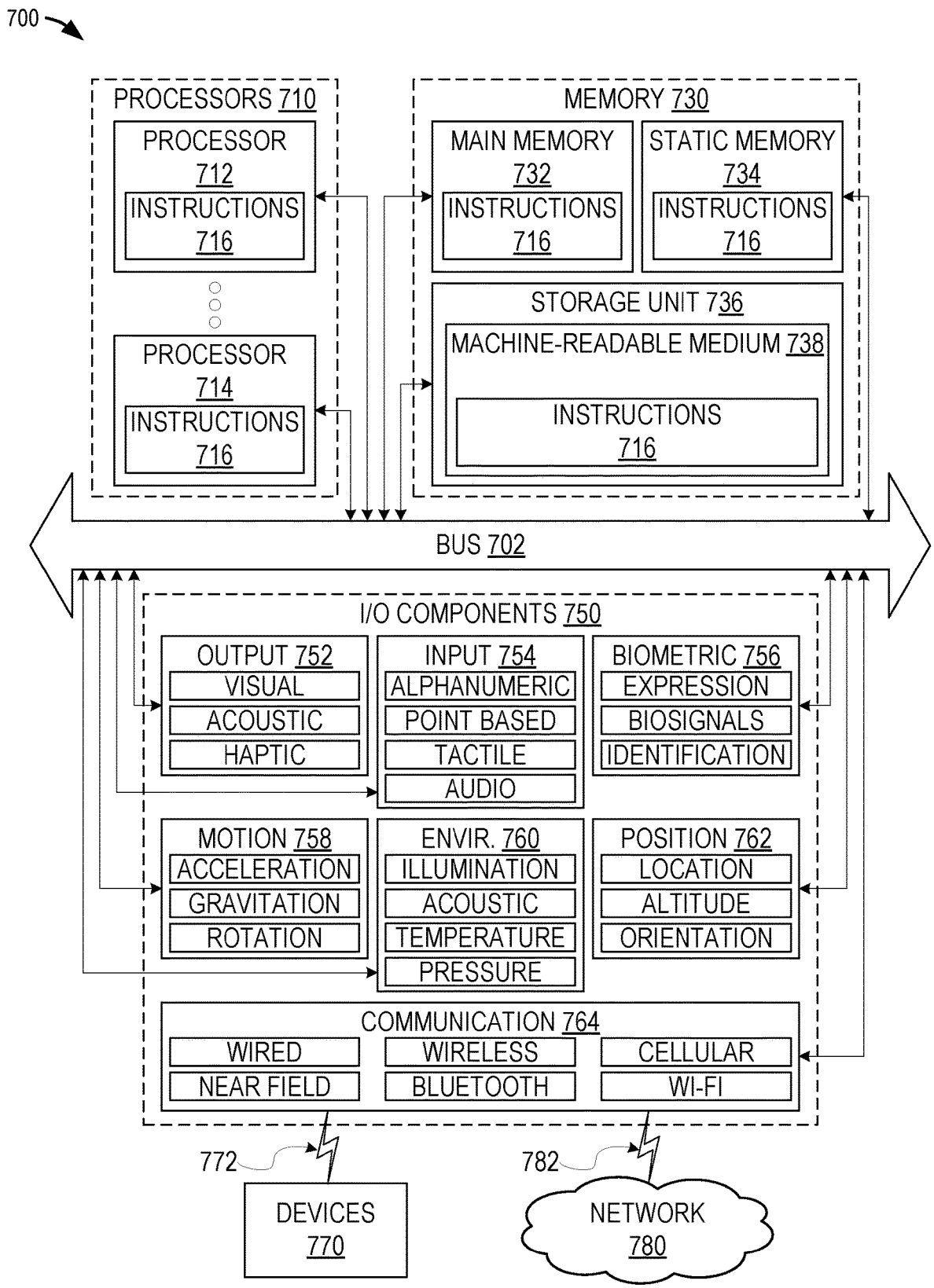
FIG. 7 illustrates a diagrammatic representation of a machine, in the form of a computer system, within which a set of instructions may be executed for causing the machine to perform any one or more of the methodologies discussed herein, according to an example embodiment.

FIG. 7 is a block diagram illustrating components of a machine 700, according to some embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application 610, an applet, an app, or other executable code) for causing the machine 700 to perform any one or more of the methodologies discussed herein can be executed. In alternative embodiments, the machine 700 operates as a standalone device or can be coupled (e.g., networked) to other machines. In a networked deployment, the machine 700 may operate in the capacity of a server machine or system 130, 102, 120, 122, 124, etc., or a client device 110 in a server-client network environment, or as a peer machine in a peer-to-peer (or distributed) network environment. The machine 700 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

In various embodiments, the machine 700 comprises processors 710, memory 730, and I/O components 750, which can be configured to communicate with each other via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 712 and a processor 714 that may execute the instructions 716. The term "processor" is intended to include multi-core processors 710 that may comprise two or more independent processors 712, 714 (also referred to as "cores") that can execute instructions 716 contemporaneously. Although FIG. 7 shows multiple processors 710, the machine 700 may include a single processor 710 with a single core, a single processor 710 with multiple cores (e.g., a multi-core processor 710), multiple processors 712, 714 with a single core, multiple processors 712, 714 with multiples cores, or any combination thereof.

The memory 730 comprises a main memory 732, a static memory 734, and a storage unit 736 accessible to the processors 710 via the bus 702, according to some embodiments. The storage unit 736 can include a machine-readable medium 738 on which are stored the instructions 716 embodying any one or more of the methodologies or functions described herein. The instructions 716 can also reside, completely or at least partially, within the main memory 732, within the static memory 734, within at least one of the processors 710 (e.g., within the processor's cache memory), or any suitable combination thereof, during execution thereof by the machine 700. Accordingly, in various embodiments, the main memory 732, the static memory 734, and the processors 710 are considered machine-readable media 738.

As used herein, the term "memory" refers to a machine-readable medium 738 able to store data temporarily or permanently and may be taken to include, but not be limited to, random-access memory (RAM), read-only memory (ROM), buffer memory, flash memory, and cache memory. While the machine-readable medium 738 is shown, in an example embodiment, to be a single medium, the term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions 716, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 750 include a wide variety of components to receive input, provide output, produce output, transmit information, exchange information, capture measurements, and so on. In general, it will be appreciated that the I/O components 750 can include many other components that are not shown in FIG. 7. The I/O components 750 are grouped according to functionality merely for simplifying the following discussion, and the grouping is in no way limiting. In various example embodiments, the I/O components 750 include output components 752 and input components 754. The output components 752 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 754 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touchscreen that provides location and force of touches or touch gestures, or other tactile input components), audio input components (e.g., a microphone), and the like.

In some further example embodiments, the I/O components 750 include biometric components 756, motion components 758, environmental components 760, or position components 762, among a wide array of other components. For example, the biometric components 756 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 include acceleration sensor components (e.g., accelerometer), gravitation sensor components, rotation sensor components (e.g., gyroscope), and so forth. The environmental components 760 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 762 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 750 may include communication components 764 operable to couple the machine 700 to a network 780 or devices 770 via a coupling 782 and a coupling 772, respectively. For example, the communication components 764 include a network interface component or another suitable device to interface with the network 780. In further examples, communication components 764 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 770 may be another machine 700 or any of a wide variety of peripheral devices (e.g., a peripheral device coupled via a Universal Serial Bus (USB)).

Moreover, in some embodiments, the communication components 764 detect identifiers or include components operable to detect identifiers. For example, the communication components 764 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 764, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 780 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WIFI® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 716 are transmitted or received over the network 780 using a transmission medium via a network interface device (e.g., a network interface component included in the communication components 764) and utilizing any one of a number of well-known transfer protocols (e.g., Hypertext Transfer Protocol (HTTP)). Similarly, in other example embodiments, the instructions 716 are transmitted or received using a transmission medium via the coupling 772 (e.g., a peer-to-peer coupling) to the devices 770. The term "transmission medium" shall be taken to include any intangible medium that is capable of storing, encoding, or carrying the instructions 716 for execution by the machine 700, and includes digital or analog communications signals or other intangible media to facilitate communication of such software.

Furthermore, the machine-readable medium 738 is non-transitory (in other words, not having any transitory signals) in that it does not embody a propagating signal. However, labeling the machine-readable medium 738 "non-transitory" should not be construed to mean that the medium is incapable of movement; the medium 738 should be considered as being transportable from one physical location to another. Additionally, since the machine-readable medium 738 is tangible, the medium 738 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
generating, by a computing device, a plurality of candidate routes to travel from a first location to a second location;
selecting a weight to assign to at least one feature to compute a route safety score for a plurality of routes based on a time of day or one or more reliability values of the at least one feature;
generating, by the computing device, a safety score for first and second candidate routes of the plurality of candidate routes based on the at least one feature associated with the respective first and second candidate routes and the selected weight; and
providing, by the computing device, a best route corresponding to the first or second candidate route having a highest safety score of the safety scores of the first and second candidate routes as a recommended travel route from the first location to the second location.

2. The method of claim 1, wherein before providing the best route the method comprises:
selecting the best route based on the generated safety score for the first and second candidate routes.

3. The method of claim 1, wherein the at least one feature comprises a number of surveillance cameras, a field of view of one or more surveillance cameras, or brightness information.

4. The method of claim 1, wherein the weight assigned to the at least one feature is further based on a resolution of a surveillance camera and brightness profile during the time of day.

5. The method of claim 1, wherein the best route is selected based on at least one parameter of a plurality of parameters comprising a fastest route, a shortest route, and a most scenic route, in addition to using the safety score associated with the first or second candidate route.

6. The method of claim 1, further comprising:
providing a recommendation for the best route by providing top candidate routes, including the best route.

7. The method of claim 6, wherein the recommendation is provided to a second computing device and the top candidate routes are displayed in a display of the second computing device with an indication of safety for each of the top candidates.

8. A computing device comprising:
a memory that stores instructions; and
one or more processors configured by the instructions to perform operations comprising:
generating, by a computing device, a plurality of candidate routes to travel from a first location to a second location;
selecting a weight to assign to at least one feature to compute a route safety score for a plurality of routes based on a time of day or one or more reliability values of the at least one feature;
generating, by the computing device, a safety score for first and second candidate routes of the plurality of candidate routes based on the at least one feature associated with the respective first and second candidate routes and the selected weight; and
providing, by the computing device, a best route corresponding to the first or second candidate route having a highest safety score of the safety scores of the first and second candidate routes as a recommended travel route from the first location to the second location.

9. The computing device of claim 8, wherein before providing the best route the operations further comprise:
selecting, by the computing device, the best route based on the generated safety score for the first and second candidate routes.

10. The computing device of claim 8, wherein the at least one feature comprises a number of surveillance cameras, a field of view of one or more surveillance cameras, or brightness information.

11. The computing device of claim 8, wherein the weight assigned to the at least one feature is further based on a resolution of a surveillance camera and brightness profile during the time of day.

12. The computing device of claim 8, wherein the best route is selected based on at least one parameter of a plurality of parameters comprising a fastest route, a shortest route, and a most scenic route, in addition to using the safety score associated with the first or second candidate route.

13. The computing device of claim 8, the operations further comprising:
providing a recommendation for the best route by providing top candidate routes.

14. The computing device of claim 13, wherein the recommendation is provided to a second computing device and the top candidate routes are displayed in a display of the second computing device with an indication of safety for each of the top candidates.

15. A non-transitory computer-readable medium comprising instructions stored thereon that are executable by at least one processor to cause a computing device to perform operations comprising:
generating, by the computing device, a plurality of candidate routes to travel from a first location to a second location;
selecting a weight to assign to at least one feature to compute a route safety score for a plurality of routes based on a time of day or one or more reliability values of the at least one feature;
generating, by the computing device, a safety score for first and second candidate routes of the plurality of candidate routes based on the at least one feature associated with the respective first and second candidate routes and the selected weight; and
providing, by the computing device, a best route corresponding to the first or second candidate route having a highest safety score of the safety scores of the first and second candidate routes as a recommended travel route from the first location to the second location.

16. The non-transitory computer-readable medium of claim 15, wherein before providing the best route the operations further comprise:
selecting, by the computing device, the best route based on the generated safety score for the first and second candidate routes.

17. The non-transitory computer-readable medium of claim 15, wherein the at least one feature comprises a number of surveillance cameras, a field of view of one or more surveillance cameras, or brightness information.

18. The non-transitory computer-readable medium of claim 15, wherein the weight assigned to the at least one feature is further based on a resolution of a surveillance camera and brightness profile during the time of day.

19. The non-transitory computer-readable medium of claim 15, wherein the best route is selected based on at least one parameter of a plurality of parameters comprising a fastest route, a shortest route, and a most scenic route, in addition to using the safety score associated with the first or second candidate route.

20. The non-transitory computer-readable medium of claim 15, the operations further comprising:
providing a recommendation for the best route by providing top candidate routes.

\* \* \* \* \*